(12) United States Patent
Augustsson

(10) Patent No.: US 6,600,852 B1
(45) Date of Patent: Jul. 29, 2003

(54) WAVELENGTH SELECTIVE DEVICE AND SWITCH AND METHOD THEREBY

(75) Inventor: Torsten Augustsson, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 202 days.

(21) Appl. No.: 09/608,105

(22) Filed: Jun. 30, 2000

(30) Foreign Application Priority Data

Jul. 1, 1999 (SE) .............................................. 9902512

(51) Int. Cl.[7] .................................................. G02B 6/28
(52) U.S. Cl. ................................ 385/24; 385/3; 385/31
(58) Field of Search ................................ 385/1–10, 14, 385/16–18, 24, 31, 37, 39–48

(56) References Cited

U.S. PATENT DOCUMENTS

| 5,832,155 A | 11/1998 | Rasch et al. | |
| 6,337,755 B1 | * 1/2002 | Cao | 359/124 |
| 6,351,581 B1 | * 2/2002 | Doerr et al. | 359/124 |

FOREIGN PATENT DOCUMENTS

WO 98/39686 9/1998

OTHER PUBLICATIONS

Augustsson, "Bragg Grating–Assisted MMI–Coupler for Add–Drop Multiplexing", Journal of Lightwave Technology, vol. 16, No. 8 Aug. 1998, pp. 1517–1522.*

Eldada et al., "Integrated Multichannel OADM's Using Polymer Bragg Grating MZI's", IEEE Photonics Technology Letters, vol. 10, No. 10, Oct. 1998, pp. 1416–1418.*

Norio Takato et al. "128–Channel Polarization–Insensitive Frequency–Selection–Switch Using High–Silica Waveguides on Si", Jun. 6, 1990, pp. 44–46, IEEE Photonics Technology Letters, vol. 2, No. 6.

J.P. Weber et al, "A New Type of Tunable Demultiplexer Using a Multi–leg Mach–Zehnder Interferometer", Apr. 1997, pp. 1–4, Proc. ECIO.

T. Augustsson, "Bragg Grating Assisted MMIMI Coupler for Wavelength Selective Switching", Dec. 10, 1998, pp. 2416–2418, Electron. Lett., vol. 34, No. 25.

J.Z. Huang, "A New Design Approach to Large Input/Output–Number Multimedia Interference Couplers and Its Application to Low–Crosstalk WDM Routers", Sep. 9, 1998, pp. 1292–1294, IEEE Photonics Technology Letters, vol. 10, No. 9.

(List continued on next page.)

*Primary Examiner*—Akm E. Ullah
*Assistant Examiner*—Michelle R. Connelly-Cushwa
(74) *Attorney, Agent, or Firm*—Burns, Doane, Swecker & Mathis L.L.P.

(57) ABSTRACT

The present invention relates to a device for wavelength selective phase control of a signal at a predetermined wavelength in a wavelength multiplexed optical signal, which comprises an input port for inputting the wavelength multiplexed optical signal, a splitting means for splitting the input wavelength multiplexed optical signal into the signal at the predetermiend wavelength and a signal comprising of substantially the remaining wavelengths in the multiplex, a phase control element for phase control of one of the two splitted signals, a combining device for combining the splitted phase-controlled signal and the other splitted signal in order to achieve a wavelength multiplexed wavelength selectively phase-controlled optical signal, and an output port for outputting the wavelength multiplexed wavelength selectively phase-controlled optical signal. A switch comprising at least one device of said kind and a method for wavelength selective phase control are likewise comprised in the present invention.

31 Claims, 10 Drawing Sheets

OTHER PUBLICATIONS

J.Z. Huang, "A New Design Approach to Large Input/Output-Number Multimedia Interference Couplers and Its Application to Low-Crosstalk WDM Routers", Dec. 1998, pp. 332–333, IEEE Lasers and Electro-Optics Society Meeting, Microelectronics Sciences Laboratories, Columbia University.

Torsten Augustsson, "Theoretical Investigation of a Wavelength Selective Switch Architecture Based on a Bragg-Grating-Assisted MMIMI Configuration", Mar. 1999, pp. 839–841, IEEE Photonics Technology Letters, vol. 11, No. 7, Jul. 1999.

Torsten Augustsson, "Cross-Coupled MZI Configuration for Wavelength Selective Switching", Jun. 10, 1999, pp. 990–992, Electronics Letters, vol. 35, No. 12.

N.S. Lagali, et al., "Theory of Variable-Ratio Power Splitters Using Multimedia Interference Couplers", pp. 665–667, IEEE Photonics Technology Letters, vol. 11, No. 6, Jun. 1999.

K. Okamoto, et al., "16-Channel Optical Add/Drop Multiplexer Using Silica-Based Arrayed Waveguide Gratings" pp. 723–724, Electronic Letter, vol. 31, (9) 1995.

L.B. Soldano, et al., "Optical Multi-Mode Interference Devices Based on Self-Imaging", Principles and Application, J. Lightwave Technology, vol. 13 (4), pp. 615–627, 1995.

G.P. Agrawal et al., "Phase-Shifted Fiber Gratings and Their Application for Wavelength Demultiplexing", IEEE Photon. Tech. Letter, vol. 6 (8), pp. 995–997, Aug. 1994.

T. Augustsson, "Bragg Grating Assisted MMI Coupler for Add-Drop Multiplexing", J. Lightwave Technology, vol. 16 (8), pp. 1517–1522, 1998.

* cited by examiner

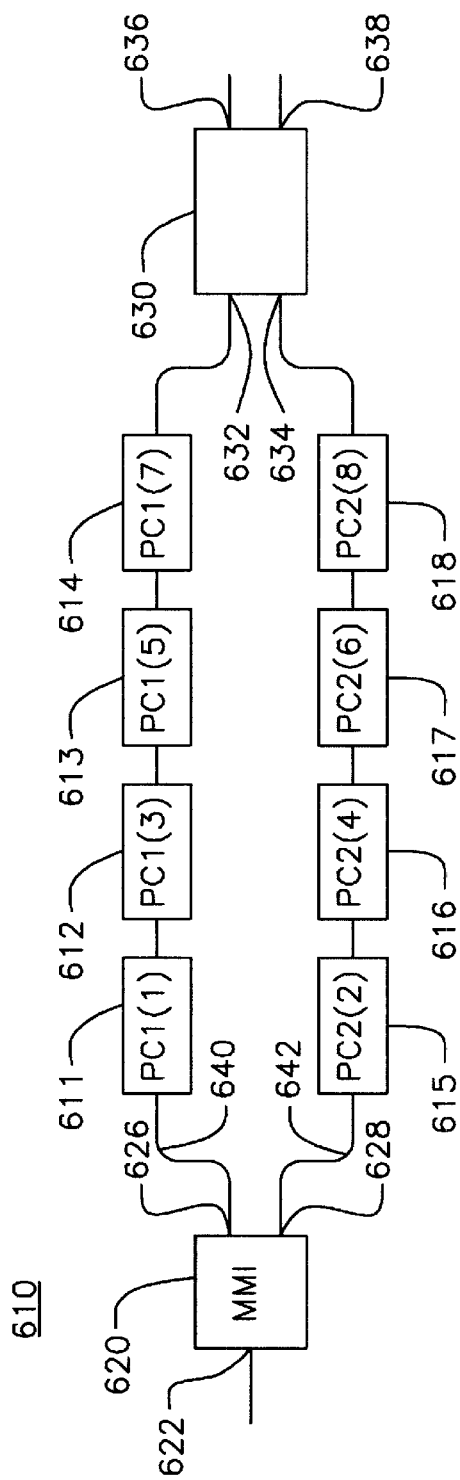
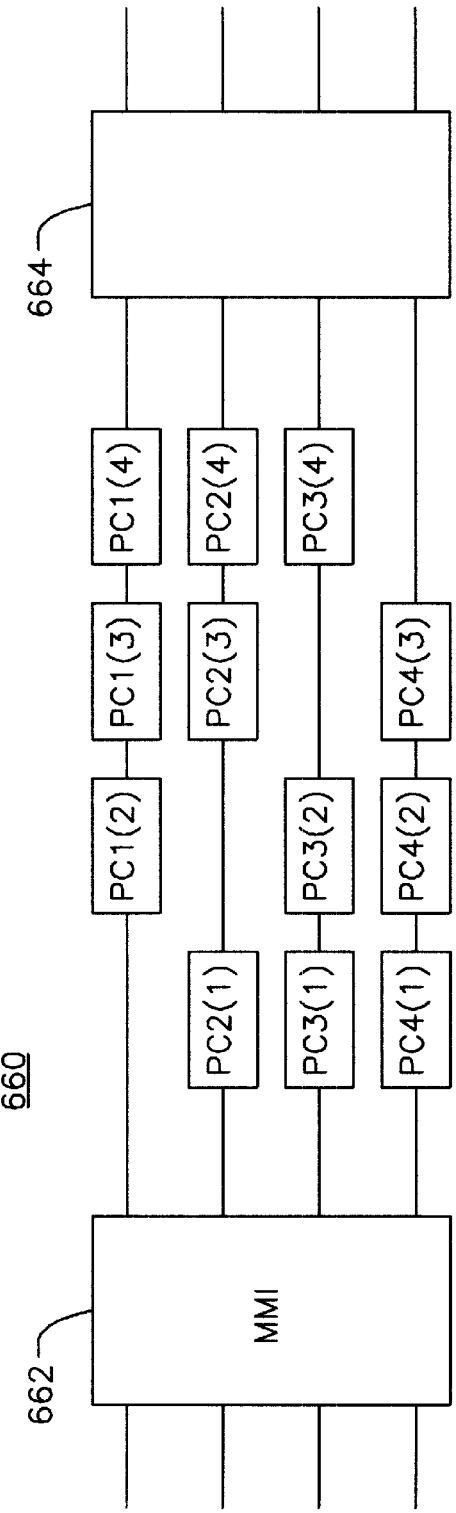
Fig. 8
Fig. 9

WAVELENGTH SELECTIVE DEVICE AND SWITCH AND METHOD THEREBY

This application claims priority under 35 U.S.C. §§119 and/or 365 to 9902512-4 filed in Sweden on Jul. 1, 1999; the entire content of which is hereby incorporated by reference.

TECHNICAL FIELD

The present invention relates to optical transmission techniques, particularly single mode integrated optics for tele and data communication. Specifically, the invention relates to a wavelength selective device, to a switch and to a method thereby.

RELATED ART

A number of methods for increasing the capacity of optical fibres in a network are known. One of these comprises utilizing wavelength division multiplexing (WDM) to increase the utilization of the bandwidth in the network, which, however, requires the provision of devices that are capable to multiplex, demultiplex and filter transmission channels that are transferred at different so-called optical carrier wavelengths in the network. To achieve selective routing of each individual wavelength channel, wavelength selective coupling devices, so-called wavelength selective switches, are required.

Several different principles for wavelength routing are known in the literature.

N. Takato et al describe in 128-*Channel Polarization-Insensitive Frequency-Selection-Switch Using High-Silica Waveguides on Si*, IEEE Photon. Tech. Lett., volume 2(6), pages 441–443, June 1990, a principle for a wavelength selective switch that relies on asymmetrical, cascade-coupled Mach-Zehnder interferometers (MZI). Hereby, a 1-N switch may be realized, wherein optical signals at N equidistant separated wavelengths may be coupled between N outputs, however, not completely individually to each other.

The publication *A new type of tunable demultiplexer using a multileg Mach-Zehnder interferometer*, by J.-P. Weber et al, Proc. ECIO '97 EthE5, Stockholm, pages 272–275, 1997, shows an MMIMZI device (multimode interference Mach-Zehnder interferometer) that may be used for cyclic, wavelength selective routing.

T. Augustsson, *Bragg grating assisted MMIMI coupler for wavelength selective switching*, Electron. Lett., volume 34(25), pages 2416–2418, 1998 and WO 98/39686 describe an MMIMIBg device (Bragg grating assisted multimode interference Michelson interferometer) that offers complete channel-individual routing.

K. Okamoto et al discuss in 16 *channel optical add/drop multiplexer using silica-based arrayed-waveguide gratings*, Electron. Lett., volume 31(9), pages 723–724, 1995 an AWG-based configuration (AWG, Arrayed Waveguide Grating), with which individual routing in principle may be achieved.

Generally, the problems of the above-mentioned known techniques comprise large power losses, difficulties to keep the channel crosstalk at an acceptably low level and power variations between different channels caused by e.g. interference effects. The configurations which offer rather good performance are all related with high costs due to large and/or complicated structures.

Particularly the following limitations are true for the different above-mentioned techniques. The technique according to N. Takato exhibits pointed passbands, which may cause e.g. power losses. With the technique according to J.-P. Weber a very narrow area where the crosstalk performance is good (i.e. low crosstalk) is achieved. This is in principle possible to compensate for, but needs complex interference circuits to achieve a non-linear phase response in the Mach-Zehnder arms of the device. The technique according to T. Augustsson needs a large circuit if many channels are to be handled. Even if the theory behind the technique indicates low crosstalk, e.g. process-dependent scattering effects may increase the crosstalk. The device is probably particularly sensitive to scattering losses in respect of crosstalk, since the component is based on reflection in long Michelson interferometer arms. Finally, the technique described by K. Akamoto needs a large chip surface. It exhibits furthermore pointed passbands, which may be compensated for to the cost of high power losses.

SUMMARY OF THE INVENTION

It is an object of the present invention to provide a device for wavelength selective phase control of a wavelength channel comprised in a wavelength selective multiplexed optical signal.

It is a further object of the invention to provide one or several devices of the above mentioned type of high performance, preferably for implementation in a switch with completely individual routing possibilities as regards the wavelength channels comprised in a wavelength multiplexed optical signal.

It is hereby a particular object of the invention to provide one or several devices for realization of a switch in lack of one or several of the drawbacks that are associated with known art.

According to a first aspect of the present invention a device for wavelength selective phase control of a signal at a predetermined wavelength comprised in a wavelength multiplexed optical signal is provided, said device comprising an input port for inputting the wavelength multiplexed optical signal, a splitting means for splitting the input wavelength multiplexed optical signal into the signal at the predetermined wavelength and a signal comprising substantially the other wavelengths in the multiplex, a phase control means for phase-controlling one of the two splitted signals, a combining means for combining the splitted phase-controlled signal and the other splitted signal to achieve a wavelength multiplexed wavelength selectively phase-controlled optical signal and an output port for outputting the wavelength multiplexed wavelength selectively phase-controlled optical signal.

Preferably, the device also comprises a waveguide for the respective splitted signal, each connected between a respective output port of the splitting means and a respective input port of the combining means, whereby the phase control element is arranged at one of these waveguides. Preferably, the inventive device is arranged with substantially equal propagation distance for the splitted signals.

The splitting means and/or the combining means may be comprised of a Bragg grating assisted MMI structure (MMI, multimode interference) or a Bragg grating assisted MMIMZI structure (MMIMZI, multimode interference Mach-Zehnder interferometer).

The splitting means and the combining means may alternatively be composed of one and the same structure, whereby the device comprises a feedback means for the guidance of one of the two splitted signals from said structure through the phase control element for phase control and back to said structure.

In this case, said structure comprises preferably a coupler connected to two waveguides provided with Bragg gratings, where said coupler is arranged for inputting the wavelength multiplexed optical signal and outputting said wavelength multiplexed optical signal into the two waveguides provided with Bragg gratings, where the Bragg gratings are arranged for splitting the signal into the signal at the predetermined wavelength and the signal comprising substantially the rest of the wavelengths in the multiplex by reflection of one of the signals and transmission of the other signal, said feedback means being arranged for guiding the transmitted signal from said structure, through the phase control means for phase control and back to said structure, said Bragg grating being further arranged for combining the divided signals through transmission of the returned phase-controlled signal, and said coupler is further arranged for receiving the combined wavelength multiplexed wavelength selectively phase-controlled optical signal and for outputting the same at the output port of the device.

The feedback means may comprise a further coupler and a waveguide loop for guidance of the transmitted signal through the phase control means for phase control and back to the coupler, whereby the further coupler is arranged for inputting the signal transmitted through the Bragg gratings, for outputting the same in said waveguide loop, for connecting the phase-controlled signal guided through the phase control means, and for outputting the same in said waveguides provided with said Bragg gratings.

All the couplers are preferably composed of MMI waveguide structures, but they may alternatively be comprised of directional couplers.

Alternatively, the feedback means comprises part of the waveguides provided with Bragg gratings and a reflection means for reflection of the transmitted signal back in the waveguides provided with the Bragg gratings. In this respect the phase control means comprises two phase control elements localized in the respective prolongation of the waveguides provided with the Bragg gratings. The reflection means may here be constituted by a structure for total reflection or of a Bragg grating for reflection of the transmitted signal.

In alternative embodiments the splitting means and/or the combining means may comprise an optical circulator or a Y coupler.

The Bragg gratings in the splitting and combining means may either be arranged to reflect the signal at the predetermined wavelength or to transmit the signal at the predetermined wavelength.

The phase control means is preferably arranged for phase control of the signal at the predetermined wavelength.

The device can further comprise at least one phase modulation means for wavelength selective phase modulation of the wavelength multiplexed optical signal.

Furthermore, the present invention comprises a switch for switching of at least one wavelength channel comprised in a wavelength multiplexed multichannel optical signal, comprising at least one device of the above said kind and adjusted for said wavelength channel.

Preferably, the switch comprises an interference circuit, particularly a Mach-Zehnder interferometer structure.

It is a further object of the invention to provide at least one method for wavelength selective phase control of a signal at a predetermined wavelength comprised in a wavelength multiplexed optical signal.

According to a further aspect of the present invention a method is thus provided comprising receiving the wavelength multiplexed optical signal, splitting the received wavelength multiplexed optical signal into the signal at the predetermined wavelength and a signal comprising substantially the rest of the wavelengths in the multiplex, phase-controlling at least one of the two splitted signals, combining the splitted phase-controlled signal and the other divided signal to obtain a wavelength multiplexed wavelength selectively phase-controlled optical signal, and outputting the wavelength multiplexed wavelength selectively phase-controlled optical signal into a waveguide.

Further objects of the present invention will be apparent from the following specification.

An advantage of the present invention is that switches of very flexible functionality are obtained when they are being implemented using one or several inventive wavelength selective phase control devices.

Yet an advantage of the invention is that it provides for an excellent possibility to realize switches of improved performance in relation to known switches.

A further advantage of the inventive switch is that it in some respects exhibits more system tolerant properties in comparison with known technique.

Further advantages of the present invention will be apparent from the following specification.

SHORT DESCRIPTION OF THE DRAWINGS

The invention will be described closer below with reference to the enclosed drawings, which are shown only to illustrate the invention and shall therefore in no sense limit the same.

FIG. 8 illustrates, schematically, an eight-channel 1×2 switch according to an eighth embodiment of the present invention comprising eight inventive wavelength selective phase control devices of type A.

FIG. 9 illustrates, schematically, a four-channel 4×4 switch according to a ninth embodiment of the present invention comprising twelve inventive wavelength selective phase control devices of type A.

PREFERRED EMBODIMENTS

Figure 1:
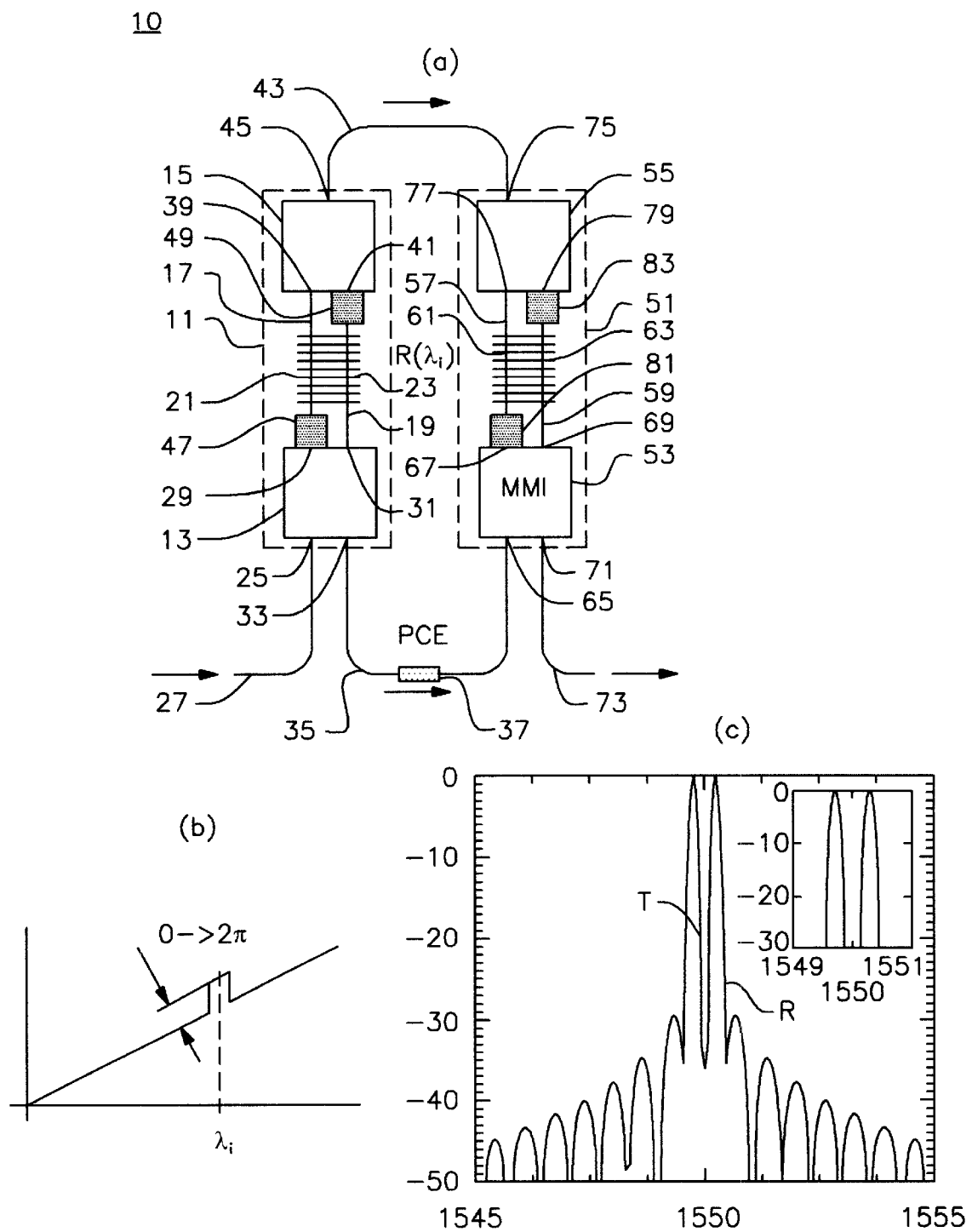
FIG. 1a illustrates, schematically, a wavelength selective phase control device according to a first embodiment of the present invention.
FIG. 1b illustrates, schematically, the phase response of said phase control device
FIG. 1c illustrates the frequency splitting in an MMIMZI structure of said phase control device.

In the following description, for purposes of explanation and not limitation, specific details are set forth, such as particular applications, techniques, methods, etc., in order to provide a thorough understanding of the present invention. However, it will be apparent to one skilled in the art that the present invention may be practised in other embodiments that depart from these specific details. In other instances, detailed descriptions of well-known methods, protocols, apparatuses or circuits are omitted so as not to obscure the description of the present invention with unnecessary details.

The present invention comprises a new and inventive combination of a number of earlier known component functions, such as splitting, filtering, combining, reflection and transmission of light, whereby different components are utilized in the different embodiments of the invention.

The invention is thus according to a first aspect comprised of a device, called WSPTC (wavelength selective phase tuning circuit) for wavelength selective phase control of a signal at a predetermined wavelength comprised in a wavelength multiplexed optical signal. The following parts are comprised in the device.

An input port for inputting the wavelength multiplexed optical signal.

A splitting means for splitting the input wavelength multiplexed optical signal into (1) the signal at the predetermined wavelength (demultiplexed wavelength channel) and (2) a signal comprising the rest of the wavelengths in the multiplex (the remaining multiplex). Typical splitting means are composed of devices provided with Bragg gratings.

A phase control element for phase control of one of the two splitted signals. Preferably, the demultiplexed wavelength channel is phase-controlled, but likewise the remaining multiplex, or alternatively both signals, may be phase-controlled.

A combining means for combining the splitted phase-controlled signal and the other splitted signal (possibly also phase-controlled) in order to obtain a wavelength multiplexed wavelength selectively phase-controlled optical signal. Typical combining means are also composed of devices provided with Bragg gratings. Preferably, the two splitted signals are arranged to travel an exactly equally long distance between the splitting and the combining devices, but the distances may of course be different, which will be described closer below.

An output port for outputting the wavelength multiplexed wavelength selectively phase-controlled optical signal.

The functionality of the present invention thus enables the affection of the phase of a wavelength channel without affecting the phase of other surrounding channels. Two different function types may be identified.

The first type, called type A, is preferred. It has a phase response with a small variable step for the wavelength that is to be phase-controlled. Important is that the phase response at $f \approx f_i$ has the same slope as the phase response at $f \neq f_i$, i.e.

$$\frac{d\Phi(f \approx f_i)}{df} \approx \frac{d\Phi(f \neq f_i)}{df}$$

where $\Phi(f)$ is the phase response, i.e. the phase of the light as a function of the frequency f, and $f_i$ is the frequency corresponding to the predetermined wavelength, i.e. the demultiplexed wavelength channel. This type is particularly suitable for implementation of 1×2 and 2×2 switches (WSS, wavelength selective switch) since only one WSPTC is needed for each channel.

The other type, called type B, has a phase response with a relatively large phase step at the wavelength that is to be phase-controlled. A part of this step is variable (often a very small part) which allows for phase control of the wavelength. For the phase response holds $$\frac{d\Phi(f \approx f_i)}{df} \neq \frac{d\Phi(f \neq f_i)}{df}$$

If a switch of the Mach-Zehnder type (described closer below ) is to be designed using this type of device, one device (WSPTC) for each channel and each Mach-Zehnder arm is needed, i.e. for 1×2 and 2×2 switches twice the number that is needed for type A.

Some devices that normally are of type B may, however, be designed so (e.g. with chirped Bragg gratings) that they satisfy the criterion according to type A.

The wavelength selective phase control device may be implemented as will be depicted in the different embodiments of the invention, i.a. by employing the following basic components:

An MMI waveguide or coupler structure (MMI, multi-mode interference) is used for the splitting of light. Theory of this may be found e.g. in L. B. Soldano and E. C. M. Pennings, *Optical Multi-Mode Interference Devices Based on Self-Imaging:* Principles and Application, J. Lightwave Technol., volume 13(4), pages 615–627, 1995, and in references therein. MMI splitting of light results in a multiple imaging of the input intensity distribution. The length/width relation of the MMI structure determines the number of images, which have a certain mutual phase relation, which depends on the access waveguide exciting the light.

A Bragg grating is used for filtering of light. Here, two types of Bragg grating are used:

1. A structure that is reflecting a narrow spectral band (one wavelength channel), while the remaining parts of the spectrum (remaining channels) are transmitted through the Bragg grating relatively undisturbed. The filter profile may be modulated by the strength, length and variable periodicity, so-called chirp, of the grating.
2. A structure that is transmitting a narrow band (a wavelength channel), while the remaining parts of the spectrum (remaining channels) are reflected by the Bragg grating. This is achieved by implementing a phase shift in the grating.

A comprehensive description of Bragg gratings for wavelength demultiplexing may be found i.a. in G. P. Agrawal and S. Radic, *Phase-shifted Fiber Gratings and their Application for Wavelength Demultiplexing*, IEEE Photon. Tech. Lett., volume 6(8), pages 995–997, August 1994.

An MMIBg structure (MMIBg, Bragg grating-assisted multimode interference) is in principle achieving a functionality for fixed add/drop multiplexing. Theory of this may be found in T. Augustsson, *Bragg grating assisted MMI coupler for add-drop multiplexing*, J. Lightwave Technol., volume 16(8), pages 1517–1522, 1998. An MMIBg structure or coupler is an example of an element with the help of which the wavelength selective phase control may be performed, see a closer description below with reference to FIG. 2. It is of great importance for the realization of the present invention that this element may be manufactured using planear waveguide technology without any need for trimming, which ought to be fully possible with the MMIBg structure.

A phase control element is an element that is needed to actively affect (control) the phase of the light. There are several types of phase control elements. Fundamental for these is that the optical wavelength is affected through an outer supplied signal (voltage, current, etc.). For the present purpose the best way to affect (control) the phase is probably to use a thermooptical element, i.e. affect the refractive index (and by that the optical path length) in the waveguide by temperature, at least as regards the material system $SiO_2/Si$. Some waveguides may also be affected in a similar way by applying an electrical field over the waveguide, i.e. affecting the refractive index electrooptically.

Figure 2:
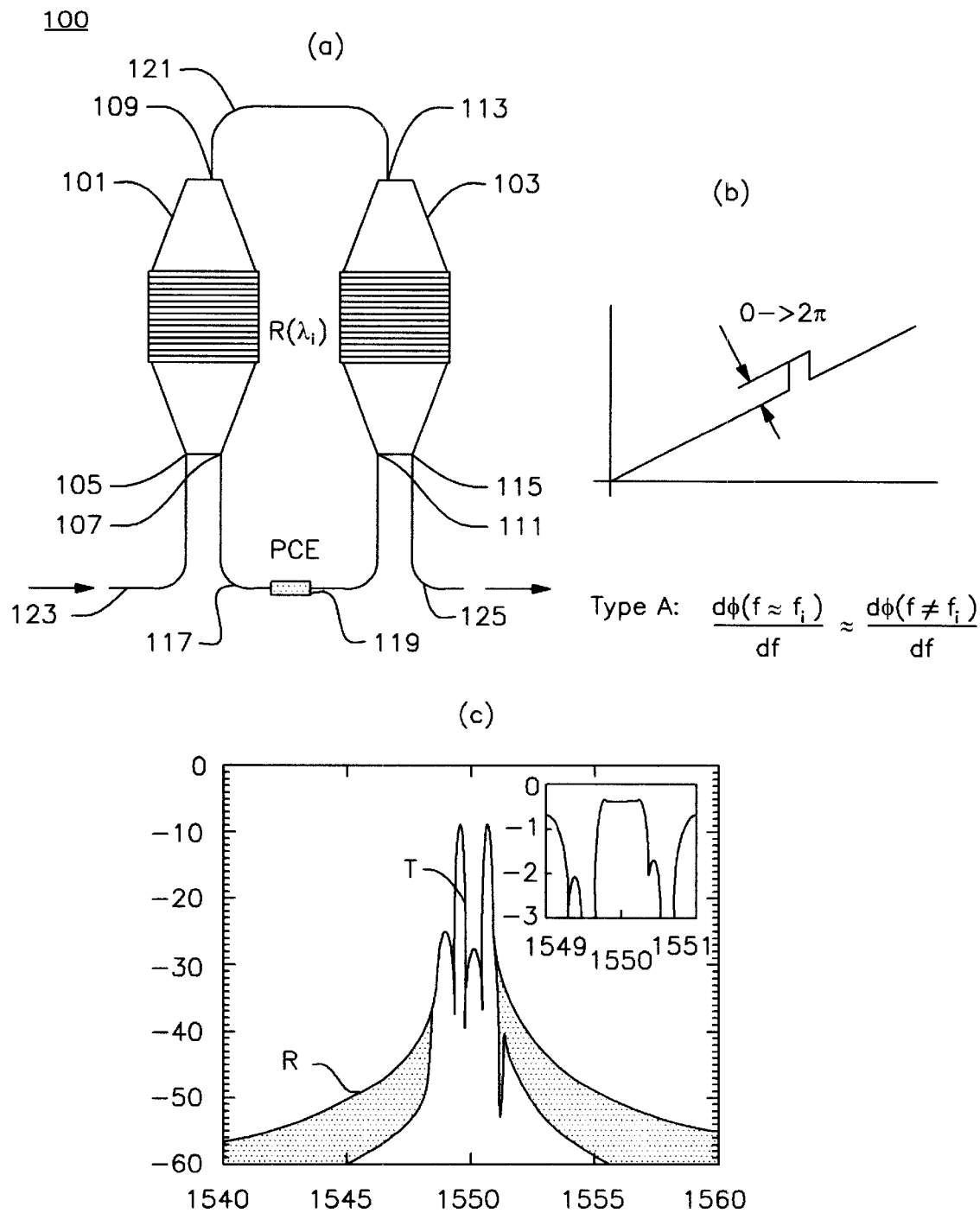
FIG. 2a illustrates, schematically, a wavelength selective phase control device according to a second embodiment of the present invention.
FIG. 2b illustrates, schematically, the phase response of said phase control device
FIG. 2c illustrates the frequency splitting in an MMIBg structure of said phase control device.
Figure 3:
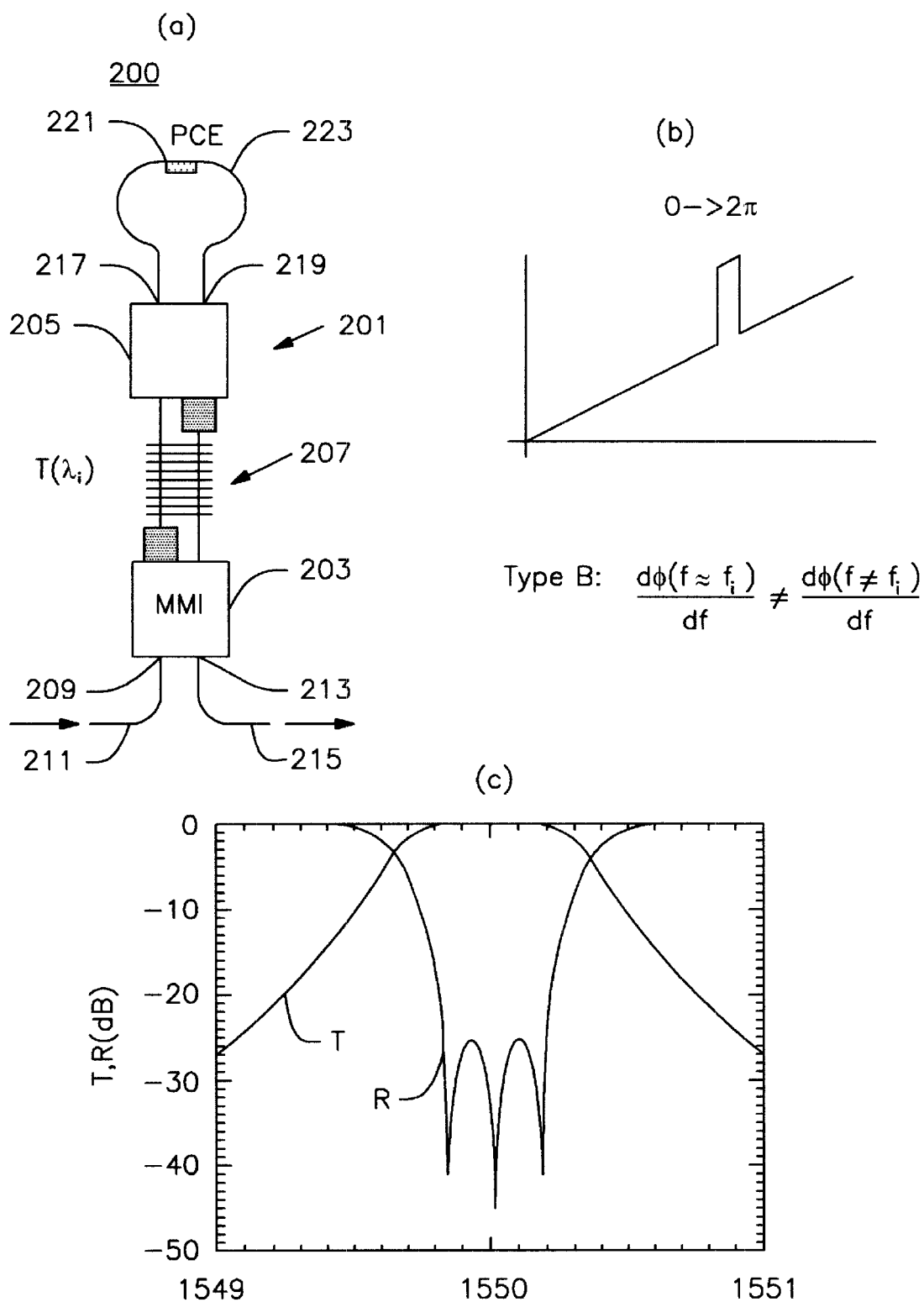
FIG. 3a illustrates, schematically, the wavelength selective phase control according to a third embodiment of the present invention.
FIG. 3b illustrates, schematically, the phase response of said phase control device
FIG. 3c illustrates the frequency splitting in a phase-shifted Bragg grating of said phase control device.
Figure 4:
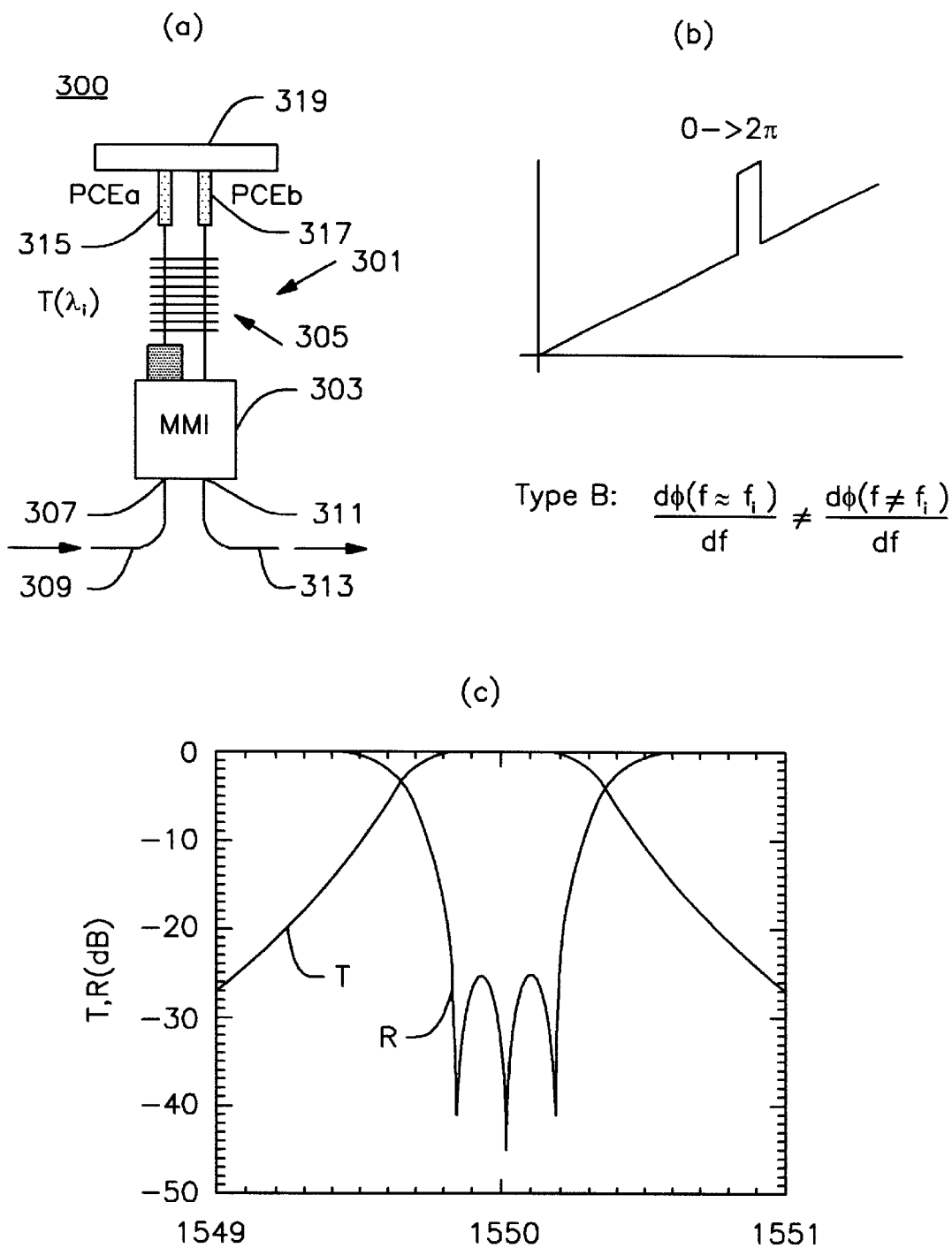
FIG. 4a illustrates, schematically, a wavelength selective control device according to a fourth embodiment of the present invention.
FIG. 4b illustrates, schematically, the phase response of said phase control device
FIG. 4c illustrates the frequency splitting in a phase-shifted Bragg grating of said phase control device..
Figure 5:
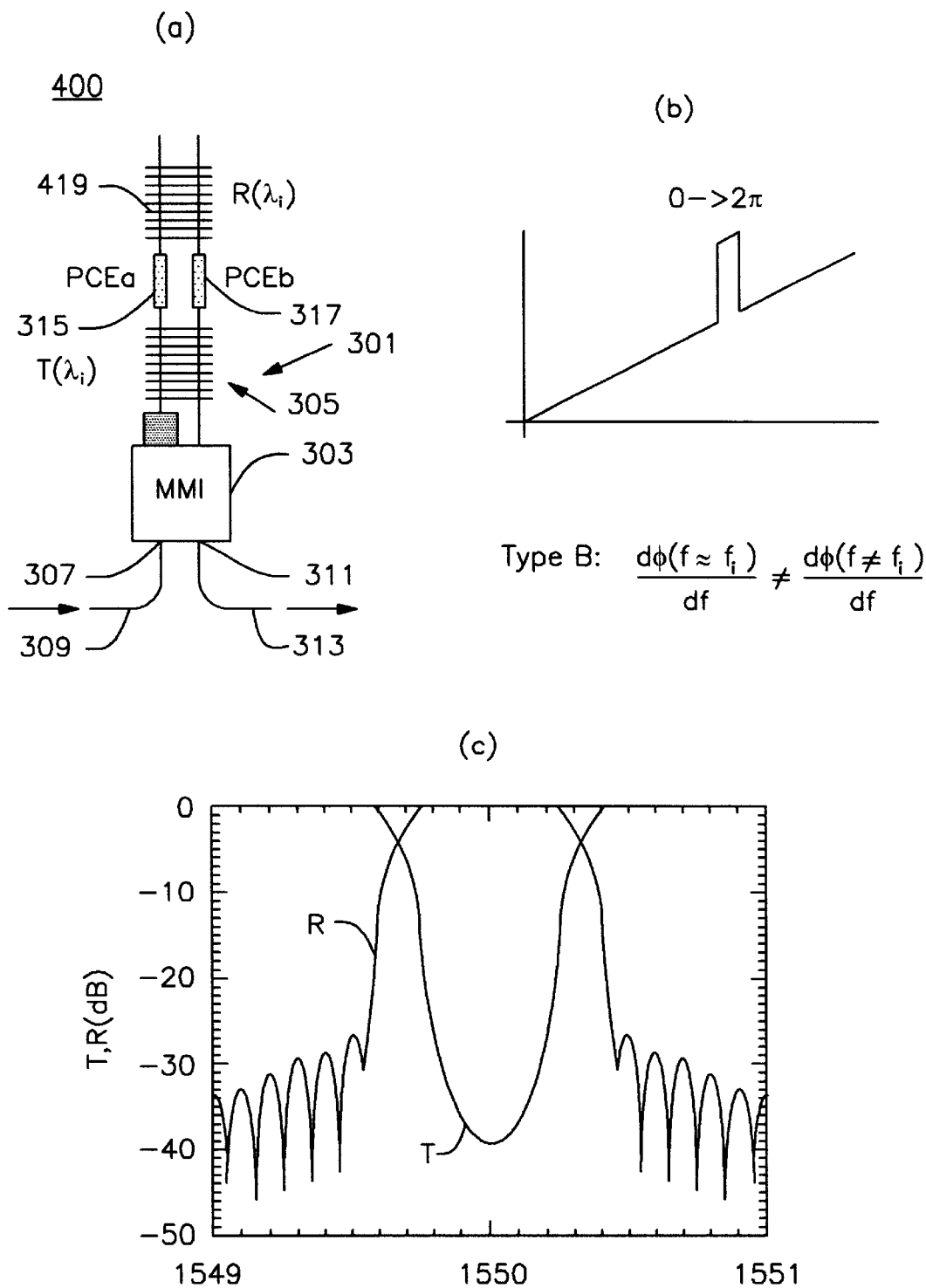
FIG. 5a illustrates, schematically, a wavelength selective phase control device according to a fifth embodiment of the present invention.
FIG. 5b illustrates, schematically, the phase response of said phase control device
FIG. 5c illustrates the frequency splitting in a Bragg grating of said phase control device.
Figure 6:
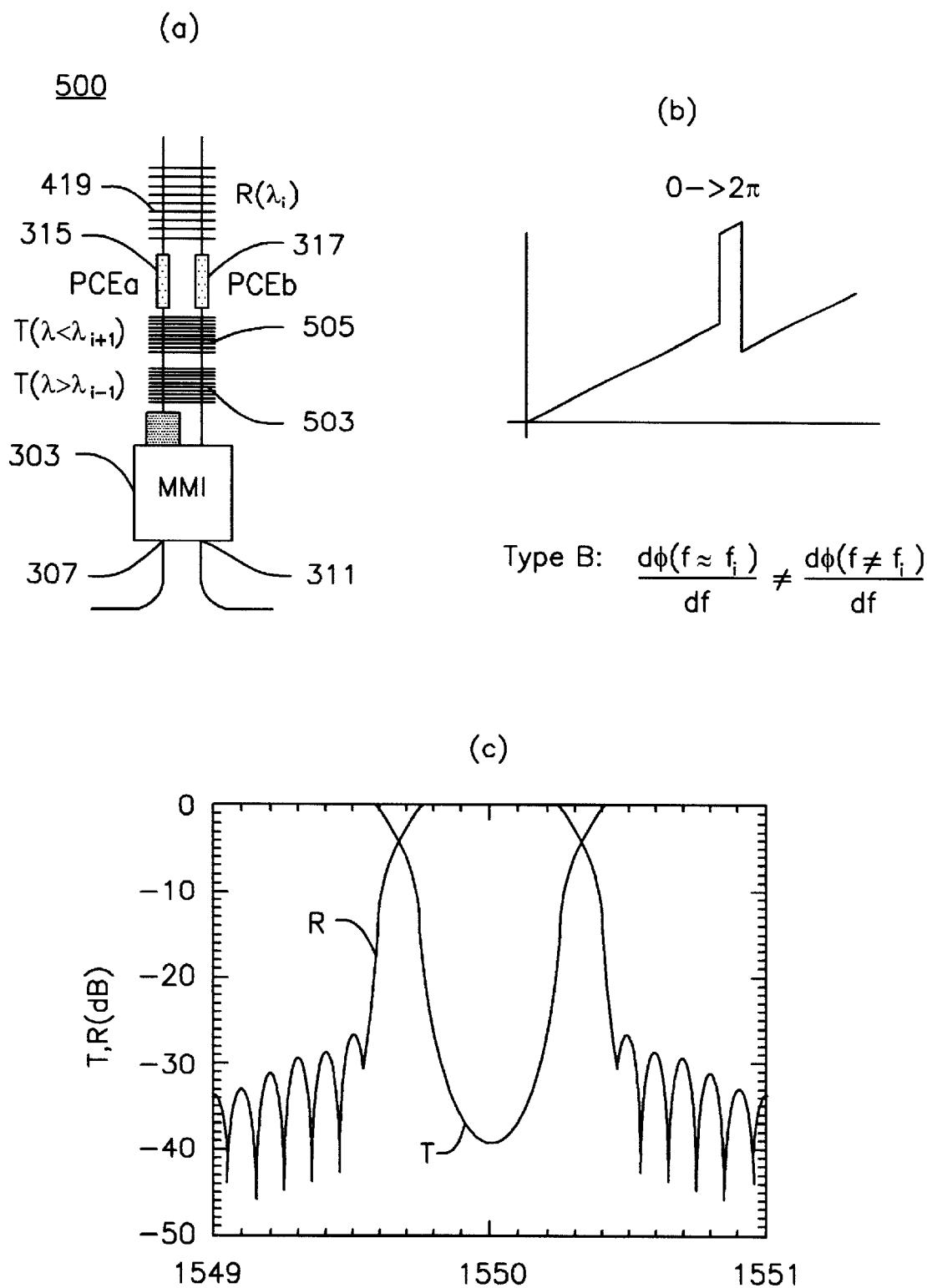
FIG. 6a illustrates, schematically, a wavelength selective phase control device according to a sixth embodiment of the present invention.
FIG. 6b illustrates, schematically, the phase response of said phase control device
FIG. 6c illustrates the frequency splitting in a Bragg grating of said phase control device.
Figure 7:
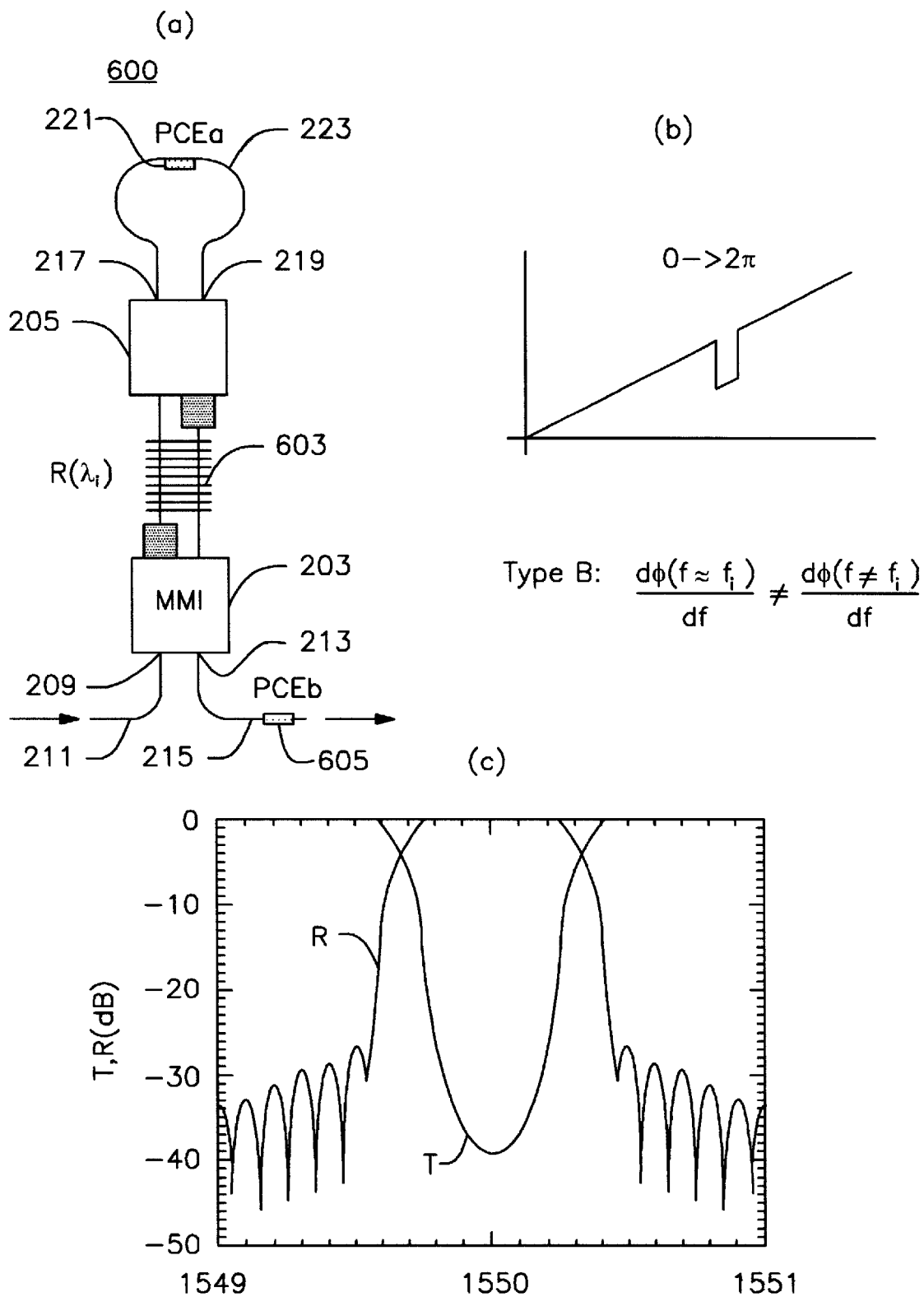
FIG. 7a illustrates, schematically, a wavelength selective control device according to a seventh embodiment of the present invention.
FIG. 7b illustrates, schematically, the phase response of said phase control device
FIG. 7c illustrates the frequency splitting in a Bragg grating of said phase control device.

With reference now to FIGS. 1–7, seven different embodiments of the inventive device (WSPTC) for wavelength selective phase control will be closer described. Of these, the two first, shown in FIGS. 1–2, are of type A, while the five subsequent ones, shown in FIGS. 3–7, are of type B. Some of these latter may possibly be modified to type A (through e.g. chirped Bragg gratings).

With reference now to FIG. 1a, which schematically illustrates a wavelength selective phase control device 10 according to the invention, the splitting means is comprised of a so-called Bragg grating-assisted MMIMZI structure (MMIMZI, multimode interference Mach-Zehnder interferometer) 11 comprising a first MMI waveguide or coupler 13 connected to a second MMI waveguide 15 via two waveguides 17, 19, called Mach-Zehnder waveguides or Mach-Zehnder arms, which are provided with equally designed Bragg gratings 21, 23. The MMI waveguide 13 has an input port 25 for inputting a wavelength multiplexed optical signal transmitted in a waveguide 27, called access waveguide, and two in/output ports 29, 31 for outputting the wavelength multiplexed optical signal into the two waveguides 17, 19, preferably of equal intensity in each waveguide. The Bragg gratings are arranged to reflect a predetermined wavelength channel, called $\lambda_i$ or $f_i$, and transmit the remaining wavelength channels. The reflected wavelength channel is thus fed back into the MMI waveguide 13 and further fed via an output port 33 into a waveguide 35, called connection waveguide, through a phase control element 37 for phase control, to the combining means. The wavelength channels transmitted through the Bragg gratings 21, 23 are fed to the other MMI waveguide 15 via input ports 39, 41 to be further fed into a connection waveguide 43 via an output port 45. The Mach-Zehnder arms 17, 19 may be provided with trimming or adjustment devices 47, 49 for fine adjustment, particularly for compensating for inevitable variations in the manufacturing process.

The combining means is also comprised of a Bragg grating-assisted MMIMZI structure 51 comprising a first MMI waveguide 53 connected to a second MMI waveguide 55 through two Mach-Zehnder waveguides 57, 59, which are provided with similar Bragg gratings 61, 63. The first MMI waveguide 53 has an input port 65, to which the connection waveguide 45 is connected. The wavelength channel reflected in the splitting means 11 and phase-controlled by the phase control element 37 is thus fed through port 65 and fed into the two waveguides 57, 59, preferably of equal intensity in each waveguide, via in/output ports 67, 69. The Bragg gratings 61, 63 are arranged to reflect the same predetermined wavelength channel and transmit remaining channels. Preferably, all Bragg gratings 21, 23, 61, 63 are of the same kind. The wavelength channel $\lambda_i$ is thus fed back into the MMI waveguide 53 and is further fed through an output port 71 into a waveguide 73.

The second MMI waveguide 55 of the combining means is likewise provided with an input port 75, to which the connection waveguide 43, which is transmitting remaining wavelength channels, is connected. Thus, the remaining wavelength channels are fed into the MMI waveguide 55 and fed into the two waveguides 57, 59, preferably of equal intensity in each waveguide, via in/output ports 77, 79. The Bragg gratings 61, 63 are transmitting these wavelength channels, so that they preferably are super-imposing the reflected channel $\lambda_i$. The remaining wavelength channels together with the predetermined wavelength channel $\lambda_i$ are fed back into ports 67, 69 and into waveguide 73 via output port 71.

Also, the Mach-Zehnder arms 57, 59 may be provided with trimming devices 81, 83 for fine adjustment.

The device is preferably reciprocal in that it is working in an identical way if the wavelength multiplexed optical signal is input at port 71, whereby the multiplexed wavelength selectively phase-controlled optical signal thus is output through port 25. The device is capable to simultaneously operate for transmitting optical signals in opposite directions in the same waveguide, particularly if the signals transmitted in the opposite directions are using different non-overlapping wavelength bands or windows.

Preferably, the connection waveguides 35 and 43 have such a mutual length relation that the reflected and transmitted signals, respectively, have the same optical path length through the device.

FIG. 1b illustrates schematically the phase response of the phase control device shown in FIG. 1a. Through the fact that the phase-controlled wavelength channel and the remaining wavelength channels are propagating the same distance through the device a completely linear phase response with a small variable step for the wavelength $\lambda_i$, which is to be phased-controlled, is obtained.

Finally, FIG. 1c shows the frequency distribution, i.e. the transmission and the reflection characteristics T, R in decibel as a function of the wavelength in nanometer, of the MMIMZI structures 11, 51.

The WSPTC device 10 of type A ought to exhibit good filter performance. A long distance for all channels through the device may, however, cause problems with losses and instability. All but the phase-controlled channel pass through two Bragg grating sections, which may cause problems with losses, particularly for shorter wavelengths in the system. Trimming for correct focusing of the reflected channel intensity as well as the transmitted channel intensity in the MMI waveguides may be needed. This would possibly be difficult to realize in large and complex configurations.

With reference next to FIG. 2a, which schematically illustrates a wavelength selective phase control device 100 according to a second embodiment of the invention, the splitting means and the combining means are both comprised of so-called MMIBg structures 101, 103. These structures have a functionality which in the present case is identical with the Bragg grating-assisted MMIMZI structures 11, 51 in FIG. 1a. Thus, the MMIBg structure 101 comprises an input port 105 and two output ports 107, 109 and the MMIBg structure 103 comprises two input ports 111, 113 and one output port 115. A connection waveguide 117, at which a phase control element 119 is arranged, is interconnected between ports 107 and 111 and another connection waveguide 121 is interconnected between ports 109 and 113.

A wavelength multiplexed optical signal is fed through an access waveguide 123 into port 105. In the MMIBg structure 101 this signal is divided into a signal at a predetermined wavelength $\lambda_i$ (demultiplexed wavelength channel) for being output at port 107 and a signal comprising remaining wavelengths in the multiplex (remaining wavelength channels) for being output at port 109. The signal at the predetermined wavelength is transmitted from port 107 via waveguide 117 and past the phase control element 119 for phase control to the MMIBg structure 103 through port 111. The signal comprising remaining wavelengths in the multiplex is transmitted from port 109 via waveguide 121 to the MMIBg structure 103 through port 113. The MMIBg structure 103 brings the divided signals together and is feeding a wavelength selectively phase-controlled optical signal into a waveguide 125 via output port 115.

FIG. 2b illustrates schematically the phase response of the phase control device shown in FIG. 2a. A completely linear phase response with a small variable step at the wavelength $\lambda_i$, which is to be phase-controlled, is obtained. FIG. 2c shows the frequency distribution, i.e. transmission and reflection characteristics T, R, respectively, in decibel as a function of the wavelength in nonometers, of the MMIBg structures 101, 103.

The WSPTC device 100 is of type A and does not need trimming. It has, like the device in FIG. 1a, a long distance for all channels through the device, which may result in problems with losses and instability. All but the phase-controlled channel pass two Bragg grating sections, which may give further problems with losses, particularly at shorter wavelengths. The device has worse filter performance (FIG. 2c), which may be a limiting factor when closely packed channels shall be handled. Furthermore, the MMIBg principle is primarily intended for waveguides of low contrast, while the complete switching concept described below principally is suitable for high contrast waveguides.

With reference next to FIG. 3a, which schematically illustrates a wavelength selective phase control device 200 according to a third embodiment of the invention, the splitting means and the combining means both are comprised of one and the same structure 201, which is a Bragg grating-assisted MMIMZI structure, e.g. identical with the structure 11 or 51 shown in FIG. 1, except for the Bragg grating being phase-shifted, i.e. having inverted transmission and reflection characteristics. The structure comprises a first MMI waveguide 203 connected to a second MMI waveguide 205 through a Mach-Zehnder waveguide structure 207 comprising two waveguides with Bragg gratings and possibly trimming elements.

The MMI waveguide 203 has an input port 209 for inputting an wavelength multiplexed optical signal transmitted in an access waveguide 211 and an output port 213 to which a waveguide 215 is connected. The Mach-Zehnder waveguide structure 207 provided with phase-shifted Bragg gratings is arranged to transmit a wavelength channel $\lambda_i$ and reflect remaining wavelength channels. The second MMI structure 205, which is arranged to receive the transmitted wavelength channel, comprises two in/output ports 217, 219, which are connected to a connection waveguide 223, at which a phase control element 221 is arranged. The transmitted wavelength channel is hereby fed through one or other of the two in/output ports 217, 219, say 217, through the waveguide loop 223, whereby the phase may be controlled by the phase control element 221 and back to the MMI structure 205 via the other of the ports 219, 217, say 219. The phase-controlled channel is then fed to the Mach-Zehnder waveguide structure 207 and is transmitted through the same to be superimposed or multiplexed with the reflected wavelength channels, whereafter the wavelength selectively phase-controlled optical signal is fed through the MMI structure 203 and is output in the waveguide 215 via port 213.

FIG. 3b illustrates schematically the phase response of the phase control device shown in FIG. 3a. A linear phase response with a relatively large step for the wavelength $\lambda_i$, which is to be phase-controlled, is achieved. A small part of this step is variable, which implies that the wavelength channel may be phase-controlled. FIG. 3c shows the frequency distribution, i.e. transmission and reflection characteristics T, R, respectively, in decibel as a function of the wavelength in nanometers, for the phase-shifted Bragg gratings in the Mach-Zehnder waveguide structure 207.

The device is of type B. An advantage of this third embodiment is that all but the phase-controlled channel are propagating a short path through the device. Good filter performance may be difficult to realize. Trimming to correctly focus the reflected and the transmitted effect, respectively, in the device may be needed, which may be difficult to implement in large and complex configurations. The configuration of the device put high demands on the phase-shifted Bragg gratings, which implies that there ought to be needed possibilities to design strong Bragg gratings to be able to handle a large system bandwidth. Possibly, the gratings may be provided with some type of chirp.

With reference now to FIG. 4a, a wavelength selective phase control device 300 according to a fourth embodiment of the invention is described, wherein the splitting means and the combining means are comprised of one and the same structure 301 comprising an MMI waveguide 303 connected to a pair of waveguides 305 provided with phase-shifted Bragg gratings and possibly with trimming elements. The MMI waveguide comprises further an input port 307 for connection to the waveguide 309 and an output port 311 for connection to the waveguide 313. The pair of waveguides 305 is further provided with phase control elements 315, 317, one for each waveguide, beyond the Bragg grating as seen from the MMI waveguide 303, and with a mirror 319 or other structure for total reflection at the far end of the pair of waveguides, still as seen from the MMI waveguide 303.

The MMI waveguide 303 is arranged for inputting a wavelength multiplexed optical signal via port 307 and for outputting the signal in the Mach-Zehnder waveguide pair 305. The pair of waveguides 305 provided with the phase-shifted Bragg gratings is arranged to transmit a wavelength channel $\lambda_i$ and reflect remaining wavelength channels. The phase control elements 315, 317, which preferably are similar, are arranged for controlling the phase of the transmitted signal. The mirror 319 is arranged for reflection of the transmitted signal back to the Bragg gratings and the MMI waveguide 303, whereby the phase-controlled channel is transmitted through the Bragg gratings and superimposed or multiplexed with the reflected wavelength channels. Finally, the wavelength selectively phase-controlled optical signal obtained is fed through the MMI structure 303 and output in the waveguide 313 via port 311.

FIG. 4b illustrates schematically the phase response of the phase control device shown in FIG. 4a. A linear phase response with a small step at the wavelength $\lambda_i$, which is to be phase-controlled, is obtained (which step, however, is smaller than the step obtained by using the device illustrated in FIG. 3a), of which a part is variable, which results in that the wavelength channel may be phase-controlled. FIG. 4c shows the frequency distribution, i.e. transmission and reflection characteristics T, R in decibel as a function of the wavelength in nanometers, of the phase-shifted Bragg gratings.

An advantage of this type B device is that all but the phase-controlled channel are propagating a short path through the circuit. Good filter performance may be difficult to realize. Trimming of the phase control channel may be performed by balancing the phase control elements 315, 317. Trimming of the reflected channels may be needed, which may be difficult to realize in large and complex configurations. The same demands are put on the Bragg gratings as in the preceding embodiment. Implementation of the structure of total reflection may be difficult to realize.

FIG. 5a shows a wavelength selective phase control device 400 according to a fifth embodiment of the invention, which is identical with the fourth embodiment except of that the mirror 319 is replaced by Bragg grating 419 arranged to reflect the phase-controlled signal. The remaining components have the same reference numerals and identical function as the ones shown i FIG. 4a.

FIG. 5b illustrates schematically the phase response of the phase control device shown in FIG. 5a. A linear phase response with a small step at the wavelength $\lambda_i$, which is to be controlled, is obtained, of which a part is variable, which enables the wavelength channel to be phase-controlled. FIG. 5c shows the frequency distribution, i.e. the transmission and reflection characteristics T, R, respectively, in decibel as a function of the wavelength in nanometers, of the Bragg gratings 419. The frequency distribution of the phase-shifted Bragg grating comprised in the pair of waveguides 305 is identical with the one shown in FIG. 4c.

This device put somewhat lower demands on the phase-shifted Bragg gratings in comparison with the devices shown in FIGS. 3a och 4a. The filter performance is probably considerably better.

FIG. 6a shows a wavelength selective phase control device 500 according to a sixth embodiment of the invention, which is identical with the fourth embodiment except of that the mirror 319 is replaced by the Bragg gratings 419 arranged to reflect the controlled signal and that the phase-shifted Bragg gratings of the pair of waveguides 305 are replaced by Bragg gratings of high pass type 503 and low pass type 505, respectively, in the respective waveguide, which together are arranged to transmit one wavelength channel $\lambda_i$ and reflect the remaining wavelength channels. Remaining components have the same reference numerals and identical function with the ones shown in FIG. 4a.

FIG. 6b illustrates schematically the phase response of the phase control device shown in FIG. 6a. A phase response with a small step at the wavelength $\lambda_i$, which is to be phase-controlled, is obtained, of which a part is variable, which results in that the wavelength channel may be phase-controlled. Furthermore, a fixed step between the channels reflected by the high pass grating 503 and the ones reflected by the low pass grating 505 is obtained and is caused by the separated physical positions of the respective grating. FIG. 6c shows frequency distribution, i.e. transmission and reflection characteristics T, R, respectively, in decibel as a function of the wavelength in nanometers for the Bragg grating. The Bragg gratings of high pass 503 and low pass 505 type, respectively, may be of conventional type and exhibit similar transmission and reflection characteristics, however, shifted down and up in wavelengths and with a broader reflection band.

This device puts lower demands on the Bragg grating structures in comparison with the devices shown in FIGS. 3a, 4a and 5a. Separate trimming of the channels reflected by the high pass grating and the low pass grating may be needed in order to focus the light correctly in the MMI waveguide 303.

FIG. 7a shows a wavelength selective phase control device 600 according to a sixth embodiment of the invention, which is identical with the third embodiment except as regards the following. The Bragg gratings in the Mach-Zehnder waveguide structure 207 are replaced by conventional Bragg gratings 603, which reflect a wavelength channel $\lambda_i$ and transmit the remaining wavelength channels. Thus, all wavelength channels but $\lambda_i$ propagate through the MMI waveguide 205 and through the waveguide loop 223 provided with the phase control element 221, whereby all wavelength channels but $\lambda_i$ are phase-controlled. The output multiplexed signal at port 213 comprises wavelength channels, of which all but $\lambda_i$ is phase-controlled. By arranging a further phase control element 605 for phase control of the complete multiplexed signal, the phase response may be corrected so that a phase response according to the one shown in FIG. 7b is obtained.

FIG. 7b illustrates thus schematically the phase response of the phase control device shown in FIG. 7a. A phase response with a step at the wavelength $\lambda_i$, which is to be phase-controlled, is obtained, of which a part is variable, which results in that the wavelength channel may be phase-controlled. FIG. 7c shows the frequency distribution, i.e. transmission and reflection characteristics T, R, in decibel as a function of the wavelength in nanometers, of the Bragg gratings 603.

With this device of type B the phase-shifted Bragg grating, which is difficult to implement, is avoided. A disadvantage is, however, that all but the phase control channel are propagating a large distance through the device and pass two Bragg grating sections, which may cause problems with losses, particularly at shorter wavelengths in the system. Trimming may be needed.

The device for wavelength selective phase control ought alternatively to be realized with the splitting means and/or the combining means comprising an optical circulator and/or a Y coupler (not shown in the figures).

Wavelength selective switching is possible to achieve by utilizing one or several wavelength selectively control devices, WSPTC's, according to any of the seven first embodiments of the present invention.

In order to achieve a wavelength selective switch, WSS, based on such devices, an interference circuit is preferably needed. A Mach-Zehnder interferometer (MZI) ought to be particularly suitable.

A switch structure for wavelength selective switching according to the present invention comprises preferably two couplers interconnected with at least two waveguides, called Mach-Zehnder waveguides or Mach-Zehnder arms, provided with one or several of the above described wavelength selectively control devices. One of the couplers is arranged to input the incoming optical signals into the waveguides and the second coupler is arranged for outputting the optical signals from the switch in dependence of the respective phases of the optical signals, which are controlled by the one or several wavelength selectively phase-controlled devices.

Figure 10:
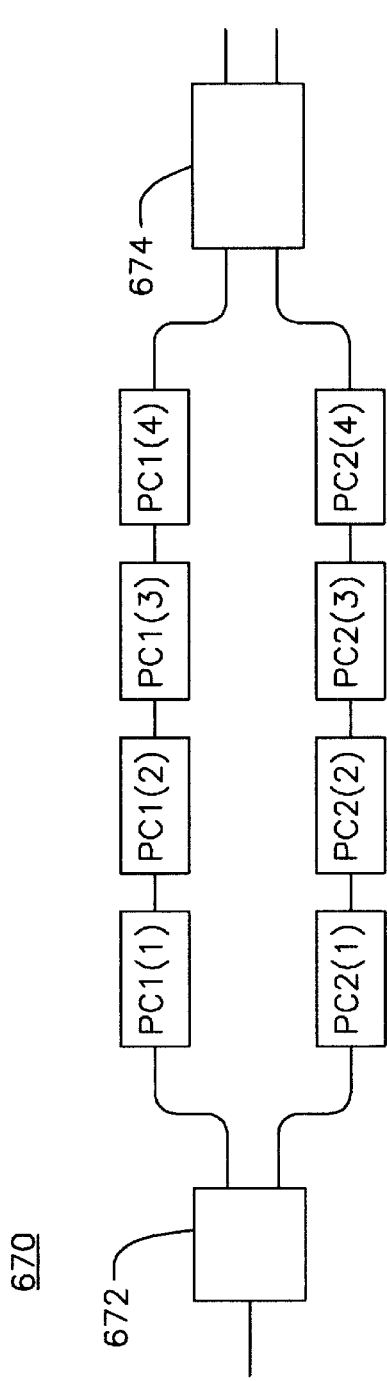
FIG. 10 illustrates, schematically, a four-channel 1×2 switch according to a tenth embodiment of the present invention comprising eight inventive wavelength selective phase control devices of type B.
Figure 11:
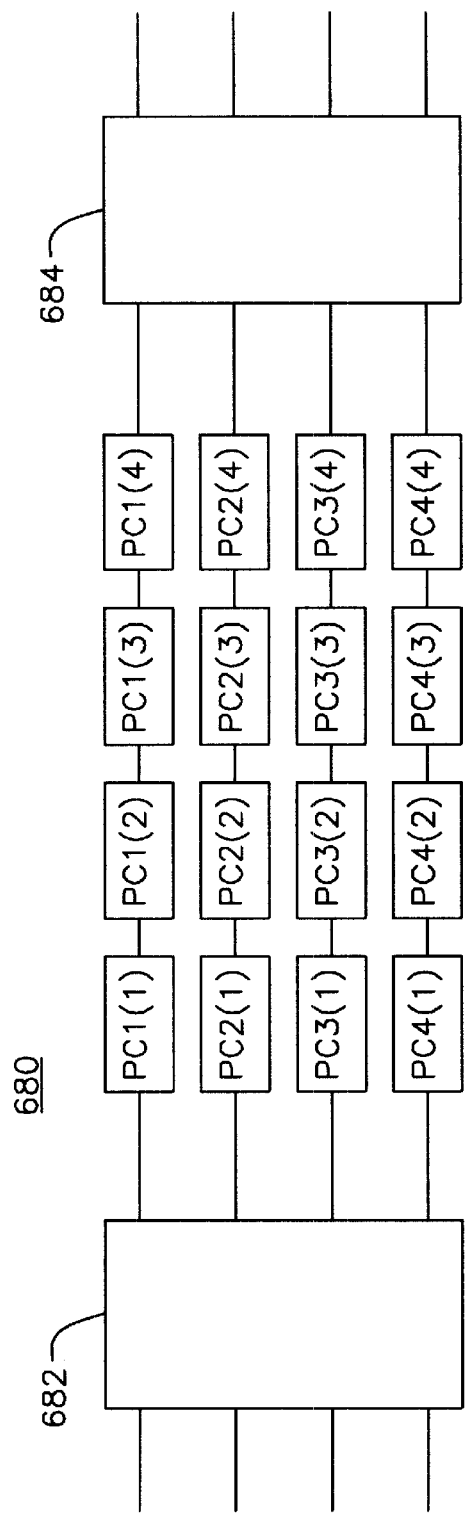
FIG. 11 illustrates, schematically, a four-channel 4×4 switch according to an eleventh embodiment of the present invention comprising twelve inventive wavelength selective phase control devices of type B.

FIGS. 8–11 thus show four different MZI/WSPTC configurations, of which FIGS. 8 and 9 show configurations, where WSPTC's of type A are utilized, and FIGS. 10 and 11 show configurations, where WSPTC's of type B are utilized. Note that WSPTC is shortened to PC in FIGS. 8–11.

With reference now to FIG. 8 an eight channel 1×2 switch 610 of Mach-Zehnder type according to an eighth embodiment of the present invention is described comprising eight inventive wavelength selective phase control devices 611–618 of type A. The switch comprises a first MMI waveguide 620 provided with an input port 622 for inputting a multiplexed signal and two output ports 626, 628 and a second MMI waveguide 630 provided with two input ports 632, 634 and two output ports 636, 638. Two Mach-Zehnder waveguides 640, 642 are interconnected between the output ports 626, 628 of the first MMI waveguide and the input ports 632, 634 of the second MMI waveguide. The MMI waveguides are provided with eight wavelength selectively controllable devices, of which each is arranged for controlling of the respective wavelength channel $\lambda_{-1}, \ldots, \lambda_{-8}$. In the shown embodiment four devices are arranged in the upper Mach-Zehnder arm 620 och four are arranged in the lower Mach-Zehnder arm 630, but nothing prevents one from arranging them in another manner, as it is fully sufficient with one device per arm and channel. In order to minimize the size of the device preferably four devices are arranged in each arm.

By controlling the phase of the respective channel by the devices 611–618 the MMI waveguide 630 may be arranged (controlled) to output the respective wavelength channel either at port 636 or at port 638. Thus, a completely individual switching of the eight wavelength channels in the incoming multiplex signal is obtained.

With reference next to FIG. 9 a four channel 4×4 switch 660 according to a ninth embodiment of the present invention is described, which comprises twelve inventive wavelength selective phase control devices of type A.

The switch 660 comprises a first MMI waveguide 662 provided with four input ports and four output ports and a second MMI waveguide 664 also provided with four input ports and four output ports. Between the MMI waveguides four parallel Mach-Zehnder arms are arranged. The device 660 is intended for the switching of four wavelength channels incoming at the input ports of the first MMI waveguides 662 to the four output ports at the other MMI waveguide 664. Each Mach-Zehnder arm comprises three devices for controlling of three different wavelength channels. Thus, the arms comprise, counted from above, devices for control of channels 2, 3 and 4, devices for control of channels 1, 3 and 4, devices for control of channels 1, 2 and 4 and devices for control of channels 1, 2 and 3. The phase controls and the MMI waveguide 664 are arranged in order to enable completely individual switching of the four wavelength channels.

FIG. 10 illustrates schematically a four channel 1×2 switch 670 according to a tenth embodiment of the present invention, which comprises eight inventive wavelength selective phase control devices of type B.

The switch 670 comprises a first MMI waveguide 672 provided with an input port and two output ports and a second MMI waveguide 674 is provided with two input ports and two output ports. Between the MMI waveguides two parallel Mach-Zehnder arms are arranged. The device 670 is intended for switching of four multiplexed wavelength channels incoming at the input port of the first MMI wageguide 672 to the two output ports at the other MMI waveguide 674. Each Mach-Zehnder arm comprises four devices for controlling of each respective wavelength channel. The phase controls and the MMI waveguide 674 are arranged so that completely individual switching of the four wavelength channels is achieved. Since the devices are of type B, one device is needed for each channel and each arm.

FIG. 11 illustrates schematically a four channel 4×4 switch 680 according to an eleventh embodiment of the present invention, which comprises sixteen inventive wavelength selective phase control devices of type B. The switch has the same function as the one shown in FIG. 9, but since type B devices are utilized, four more devices are needed for a correct function.

The device 680 comprises thus a first MMI waveguide 682 provided with four input ports and four output ports and a second MMI waveguide 684 also provided with four input ports and four output ports. Between the MMI waveguides four parallel Mach-Zehnder arms are arranged. The device 680 is, as in the case of the device shown in FIG. 9, intended for switching of four wavelength channels incoming at the input port of the first MMI waveguide 682 to the four output ports of the second MMI waveguide 684. Each Mach-Zehnder arm comprises here four devices for controlling of the four different wavelength channels. The phase controls and the MMI waveguide 684 are as above arranged so as to enable completely individual switching of the four wavelength channels.

These switching structures may in principle be enlarged in order to handle N wavelengths, where N may be arbitrarily chosen. Of course, there is a practical limit as all wavelength channels have to lie within the bandwidth of the MMI waveguides. The more channels a switch shall handle, the larger structure is needed, whereby also larger losses are obtained.

Figure 12:
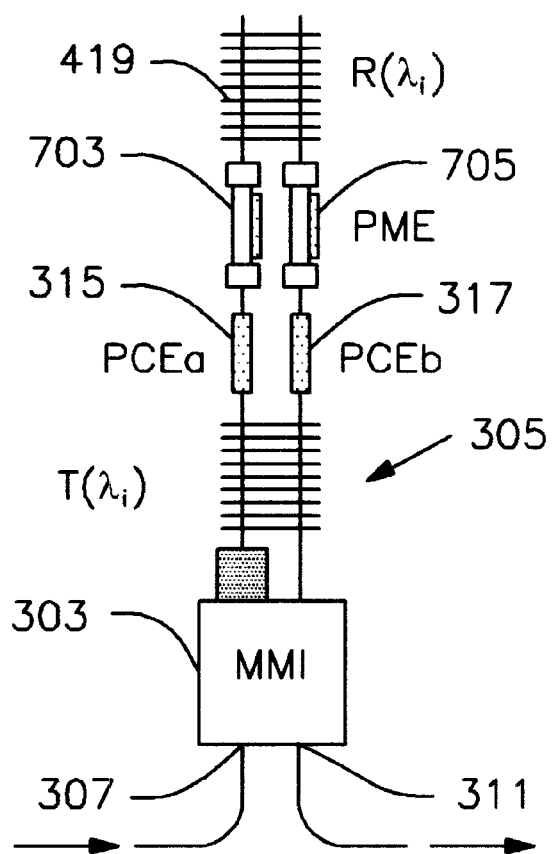
FIG. 12 illustrates, schematically, a wavelength selective phase control and modulation device according to a twelfth embodiment of the present invention.

FIG. 12 shows a wavelength selective phase control and modulation device 700 according to a twelfth embodiment of the invention, which is identical with the fifth embodiment of the present invention except in the following respects. Between the phase control elements and the Bragg gratings 419 arranged to reflect the controlled signal, there is at each waveguide arranged a respective intensity modulation element 703, 705. The other components have the same reference numerals and identical function as the ones shown in FIG. 5a. The intensity modulation elements 703, 705 may e.g. be implemented as electrooptical switches, of which each is comprising a MMIMZI structure together with an electrooptical phase modulation element.

With this configuration wavelength selective space switching and wavelength selective modulation may be achieved independently of each other. Certainly any of the embodiments 1–7 of the present invention may be modified in a similar manner to realize wavelength selective modulation.

By arranging one or more devices according to the twelfth embodiment in a switch, e.g. in a switch similar to the embodiments 8–11 of the present invention, completely individual switching as well as modulation are obtained.

According to a further aspect of the present invention a method is comprised for wavelength selectively phase-controlling a wavelength channel in a wavelength multiplexed optical signal. The method comprises generally that the signal is received and divided into said wavelength channel and a signal comprising the remaining wavelength channels in the multiplex, that at least one of the divided signals is phase-controlled, that the divided phase-controlled signal and the other divided signal are combined in order to achieve a wavelength multiplexed wavelength selectively phase-controlled optical signal.

The method may further comprise optional steps depicted above with reference to the different embodiments.

Devices and switches, respectively, according to the present invention may be manufactured integrated on a chip preferably by employing planar wavelength structures and in some monolitical semiconductor system or dielectrical waveguide system as silica on silicon.

Advantages of the present invention comprise enhanced performance at least in some respect. The present invention provides particularly for possibilities of dense channel distances, lower losses and lower crosstalk. Furthermore, components based on the present invention may be manufactured very compact provided that a high waveguide contrast may be achieved.

The invention is preferably intended to be used as a wavelength selective switch element. The invention is, however, also suitable to achieve controlled add/drop multiplexing, controlled filters, controlled mux/demux functionality, etc.

The invention is not limited to the embodiments described above and shown in the drawings but may be modified within the scope of the appended claims. Particularly, the invention is apparently not limited as regards the choise of material, dimensions or the manufacturing of the invention.

What is claimed is:

1. A device for wavelength selective phase control of a signal at a predetermined wavelength comprised in a wavelength multiplexed optical signal, said device comprising:
    an input port for inputting the wavelength multiplexed optical signal;
    a splitting means for splitting the input wavelength multiplexed optical signal into the signal at the predetermined wavelength and a signal comprising substantially the remaining wavelengths in the multiplex, wherein said splitting means includes an MMI coupler and a Bragg grating;
    a phase control means for phase control of one of the two split signals;
    a combining means for combining the split phase-controlled signal and the other split signal to achieve a wavelength multiplexed wavelength selectively phase-controlled optical signal, wherein said combining means includes an MMI coupler and a Bragg grating; and
    an output port for outputting the wavelength multiplexed wavelength selectively phase-controlled optical signal.

2. The device according to claim 1, further comprising a waveguide for the respective split signal, each of which being connected between a respective output port of the splitting means and a respective input port of the combining means, wherein the phase control means is arranged at one of these waveguides.

3. The device according to claim 2, wherein all input ports and output ports are physically separated.

4. The device according to claim 2, wherein it is arranged with a substantially equal propagation distance for the two split signals.

5. The device according to claim 2, wherein the splitting means comprises a Bragg grating-assisted MMI coupler.

6. The device according to claim 2, wherein the combining device comprises a Bragg grating-assisted MMI coupler.

7. The device according to claim 2, wherein the splitting means comprises two couplers interconnected by two waveguides provided with Bragg gratings.

8. The device according to claim 7, wherein one of the couplers is arranged for inputting the wavelength multiplexed optical signal and outputting said wavelength multiplexed optical signal in the two waveguides provided with Bragg gratings; the Bragg gratings are arranged for splitting the signal into the signal at the predetermined wavelength and the signal comprising substantially the remaining wavelengths in the multiplex by reflecting one of the signals and transmitting the other signal, the other coupler is arranged for inputting the signal transmitted through the Bragg gratings and for outputting the same in the waveguide connected to one of the output ports of the splitting means; and said first coupler is further arranged for inputting the signal reflected at the Bragg gratings and for outputting of the same in the waveguide connected to the other output port of the splitting means.

9. The device according to claim 7, wherein Bragg gratings are arranged to reflect the signal at the predetermined wavelength.

10. The device according to claim 7, wherein the Bragg gratings are arranged to transmit the signal at the predetermined wavelength.

11. The device according to claim 7, wherein each coupler is comprised of an MMI waveguide structure.

12. The device according to claim 2, wherein the combining means comprises two couplers interconnected by two waveguides provided with Bragg gratings.

13. The device according to claim 12, wherein one of the couplers of the combining means is arranged for inputting one of the split signals at one of the input ports of the combining means and outputting said split signal in the waveguides of the combining means; the other coupler of the combining means is arranged for inputting the other split signal at the other of the input ports of the combining means and outputting said other split signal in the waveguides of the combining means; the Bragg gratings of the combining means are arranged for combining the split signals by reflecting one of the split signals and transmitting the other one; and said said one of the couplers of the combining means is further arranged for inputting the combined wavelength multiplexed wavelength selectively phase controlled optical signal and for outputting the same at the output of the device.

14. The device according to claim 1, wherein the phase control means is arranged for phase control of the signal at the predetermined wavelength.

15. The device according to claim 1, wherein the phase control means is arranged for phase control of the signal comprising substantially the remaining wavelengths in the multiplex.

16. The device according to claim 15, comprising a further phase control means for phase control of the combined wavelength multiplexed wavelength selectively phase-controlled optical signal.

17. The device according to claim 1, wherein the splitting means and the combining means are comprised of one and the same structure and the device comprises a feedback means for guidance of one of the two split signals from said structure through the phase control means for phase control and back to said structure.

18. The device according to claim 17, wherein said structure comprises a coupler connected to two waveguides provided with Bragg gratings.

19. The device according to claim 18, wherein said coupler is arranged for inputting the wavelength multiplexed optical signal and outputting said wavelength multiplexed optical signal in the two waveguides provided with Bragg gratings; the Bragg gratings are arranged for splitting the signal into the signal at the predetermined wavelength and the signal comprising substantially the remaining wavelengths in the multiplex by reflecting one signal and transmitting the other signal; said feedback means is arranged for guidance of the transmitted signal from said structure through the phase control means for phase control and back to said structure; said Bragg gratings are further arranged for combining the split signals by transmitting the returned phase-controlled signal; and said coupler is further arranged for inputting the combined wavelength multiplexed wavelength selectively phase controlled optical signal and for outputting the same at the output port of the device.

20. The device according to claim 19, wherein the feedback means comprises a further coupler and a waveguide loop for guidance of the transmitted signal through the phase control means for phase control and back to the further coupler, whereby the further coupler is arranged for inputting the signal transmitted through the Bragg gratings, for outputting the same in said waveguide loop, for inputting the phase-controlled signal guided through the phase control means and for outputting the same in said waveguides provided with Bragg gratings.

21. The device according to claim 19, wherein the feedback means comprises a prolongation of the waveguides provided with Bragg gratings, and comprises the reflection means for reflecting the transmitted signal back in said waveguides and the phase control means comprises two phase control elements localized in respective of said waveguides.

22. The device according to claim 21, wherein the reflection means comprises a structure for total reflection of the transmitted signal.

23. The device according to claim 21, wherein the reflection means comprises Bragg gratings for reflection of the transmitted signal.

24. The device according to claim 1, wherein each phase control means is comprised of a thermooptical or electrooptical device.

25. The device according to claim 1, comprising at least one intensity modulation means for wavelength selective phase modulation of the wavelength multiplexed optical signal.

26. The device according to claim 25, comprising an intensity modulation means for each phase control means or element arranged in series with the respective phase control means or element.

27. The device according to claim 25, wherein the intensity modulation means comprises an electrooptical switch.

28. A switch for switching of at least one wavelength channel comprised in a wavelength multiplexed multichannel optical signal, wherein it comprises at least one device according to claim 1 adapted for phase control of said wavelength channel.

29. The switch according to claim 28, wherein it comprises an interference circuit, particularly a Mach-Zehnder interferometer structure.

30. The switch according to claim 29, wherein it comprises a first and a second coupling device, preferably MMI waveguide structures, interconnected by at least two Mach-Zehnder waveguides, of which at least one of the waveguides is provided with the at least one device, and which second coupling device comprises at least two output ports, whereby the first coupling device is arranged for inputting the wavelength multiplexed multichannel optical signal and outputting the same in the Mach-Zehnder waveguides, the at least one device is arranged for phase control of the wavelength channel comprised in the optical signal and the second coupling device is arranged for receiving said wavelength selectively phase-controlled optical signal and outputting the optical wavelength channel at either of its output ports in dependence on the phase of the wavelength channel.

31. A method for wavelength selective phase control of a signal at a predetermined wavelength in a wavelength multiplexed optical signal, comprising the following steps:

receiving the wavelength multiplexed optical signal;

splitting the input wavelength multiplexed optical signal into the signal at the predetermined wavelength and a signal comprising substantially the remaining wavelengths in the multiplex, wherein said splitting utilizes an MMI coupler and a Bragg grating;

phase controlling one of the two split signals;

combining the split phase controlled signal and the other split signal in order to achieve a wavelength multiplexed wavelength selectively phase controlled optical signal, wherein said combining utilizes an MMI coupler and a Bragg grating; and outputting the wavelength multiplexed wavelength selectively phase controlled optical signal.

* * * * *